s012144056B2

United States Patent
Wu et al.

(10) Patent No.: US 12,144,056 B2
(45) Date of Patent: Nov. 12, 2024

(54) SIDELINK DRX OPTIMIZATIONS FOR RRC_CONNECTED USER EQUIPMENT (UE)

(71) Applicant: APPLE INC., Cupertino, CA (US)

(72) Inventors: Zhibin Wu, Cupertino, CA (US); Chunxuan Ye, San Diego, CA (US); Dawei Zhang, Cupertino, CA (US); Fangli Xu, Beijing (CN); Haijing Hu, Cupertino, CA (US); Haitong Sun, Cupertino, CA (US); Wei Zeng, Cupertino, CA (US); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 378 days.

(21) Appl. No.: 17/593,552

(22) PCT Filed: Oct. 22, 2020

(86) PCT No.: PCT/CN2020/122962
§ 371 (c)(1),
(2) Date: Sep. 20, 2021

(87) PCT Pub. No.: WO2022/082647
PCT Pub. Date: Apr. 28, 2022

(65) Prior Publication Data
US 2022/0312543 A1 Sep. 29, 2022

(51) Int. Cl.
*H04W 76/28* (2018.01)
*H04W 92/10* (2009.01)
*H04W 92/18* (2009.01)

(52) U.S. Cl.
CPC ............ *H04W 76/28* (2018.02); *H04W 92/10* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 11,924,699 B2* | 3/2024 | Ly | H04L 5/0051 |
| 11,924,760 B2* | 3/2024 | Seo | H04W 72/0446 |
| 2019/0158229 A1* | 5/2019 | Wei | H04L 1/1848 |
| 2019/0174411 A1 | 6/2019 | Xu et al. | |

(Continued)

FOREIGN PATENT DOCUMENTS

| | | |
|---|---|---|
| CN | 111556590 A | 8/2020 |
| WO | 2018016882 A1 | 1/2018 |
| WO | 2018082541 A1 | 5/2018 |

OTHER PUBLICATIONS

Huawei et al., "Alignment between Uu DRX and SL DRX", R2-2101764, 3GPP TSG-RAN WG2 Meeting #113 electronic, Agenda Item 8.15.2.3, Jan. 25-Feb. 5, 2020, 6 pages.
Huawei et al., "Discussion on intra-frequency reselection", R2-2101704, 3GPP TSG-RAN WG2 Meeting #113-e, Agenda Item 6.12, Jan. 25-Feb. 5, 2021, 9 pages.
WIPO, International Search Report and Written Opinion, PCT/CN2020/122962, Jun. 24, 2021, 9 pages.
(Continued)

*Primary Examiner* — Mariela Vidal Carpio
(74) *Attorney, Agent, or Firm* — Dorsey & Whitney LLP

(57) ABSTRACT

SL-DRX involves both Uu and PC5 interfaces. For an RRC_CONNECTED UE (also referred to as a connected mode UE, or simply connected UE), several SL-DRX enhancements are described in this disclosure to trigger SL DRX and share configurations. Alignment of SL-DRX alignment with Uu-DRX (referred to as Uu/SL DRX alignment or simply alignment) is also described, as an optional feature (since not all schedules can temporally align).

12 Claims, 9 Drawing Sheets

(56) References Cited

U.S. PATENT DOCUMENTS

| | | | |
|---|---|---|---|
| 2020/0092719 A1* | 3/2020 | Kim | H04W 12/037 |
| 2020/0245395 A1* | 7/2020 | Zhang | H04L 5/0053 |
| 2021/0400762 A1* | 12/2021 | Jeong | H04W 24/10 |
| 2022/0069957 A1* | 3/2022 | Lee | H04W 72/23 |
| 2022/0408285 A1* | 12/2022 | Hong | H04L 27/26025 |
| 2023/0014303 A1* | 1/2023 | Di Girolamo | H04W 72/20 |
| 2023/0066448 A1* | 3/2023 | Tseng | H04W 76/23 |
| 2023/0097552 A1* | 3/2023 | Freda | H04L 1/1848 370/329 |
| 2023/0180249 A1* | 6/2023 | Bala | H04W 52/028 370/329 |
| 2023/0199905 A1* | 6/2023 | Liang | H04W 52/0235 455/574 |
| 2023/0284136 A1* | 9/2023 | Ganesan | H04W 76/28 370/311 |
| 2023/0309016 A1* | 9/2023 | Li | H04W 76/28 |
| 2023/0319951 A1* | 10/2023 | Cai | H04W 72/25 370/252 |

OTHER PUBLICATIONS

Qualcomm Incorporated et al., "New Solution: QoS aware power efficient PC5 communication", S2-2004714 (revision of S2-2004298R06), SA WG2 Meeting #139E (e-meeting), Agenda Item 8.12, Jun. 1-12, 2020, 4 pages.

ZTE, Sanechips, "Potential impact of DRX enhancement to RAN1 discussion", R1-2005962, 3GPP TSG RAN WG1 #102-e, e-Meeting, Agenda Item 8.11.3, Aug. 17-28, 2020, 2 pages.

3GPP TR 23.776, "3rd Generation Partnership Project; Technical Specification Group Services and System Aspects; Study on architecture enhancements for 3GPP support of advanced Vehicle-to-Everything (V2X) services; Phase 2 (Release 17)", V0.1.0, Jun. 2020, 11 pages.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", V16.3.0, Sep. 2020, 390 pages.

\* cited by examiner

| drx-LongCycleStartOffset | CHOICE { |
|---|---|
| ms10 | INTEGER(0..9), |
| ms20 | INTEGER(0..19), |
| ms32 | INTEGER(0..31), |
| ms40 | INTEGER(0..39), |
| ms60 | INTEGER(0..59), |
| ms64 | INTEGER(0..63), |
| ms70 | INTEGER(0..69), |
| ms80 | INTEGER(0..79), |
| ms128 | INTEGER(0..127), |
| ms160 | INTEGER(0..159), |
| ms256 | INTEGER(0..255), |
| ms320 | INTEGER(0..319), |
| ms512 | INTEGER(0..511), |
| ms640 | INTEGER(0..639), |
| ms1024 | INTEGER(0..1023), |
| ms1280 | INTEGER(0..1279), |
| ms2048 | INTEGER(0..2047), |
| ms2560 | INTEGER(0..2559), |
| ms5120 | INTEGER(0..5119), |
| ms10240 | INTEGER(0..10239) |
| | } |

IE drx-LongCycleStartOffset in TS 38.331

FIG. 8

SIDELINK DRX OPTIMIZATIONS FOR RRC_CONNECTED USER EQUIPMENT (UE)

TECHNICAL FIELD

This application relates generally to wireless communication systems, including sidelink for user equipment (UE) to UE communication.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 is a table showing drx-LongCycleStartOffset, in accordance with one embodiment.

DETAILED DESCRIPTION

Figure 1:
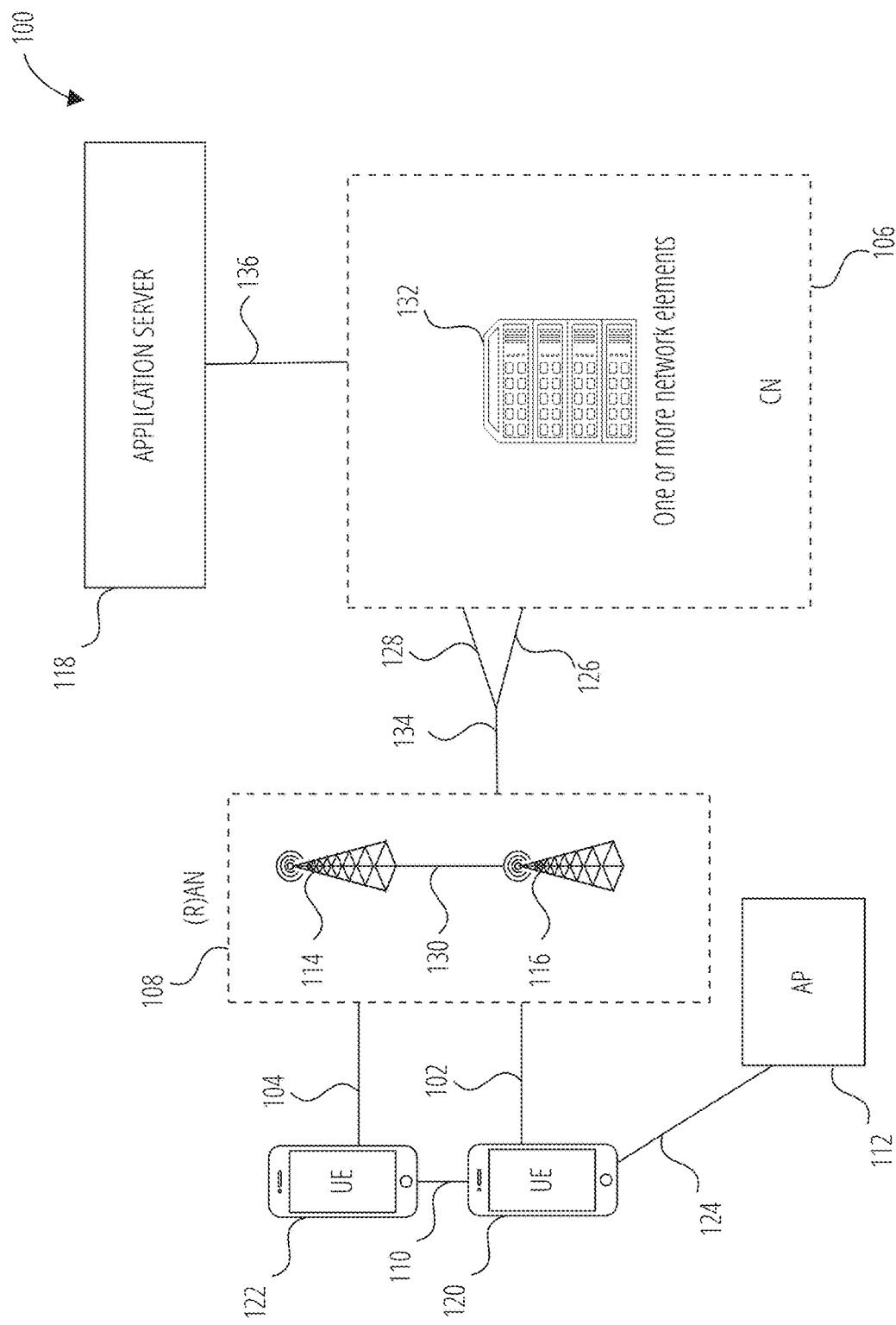
FIG. 1 is a block diagram of a system for wireless communications, in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a 5G RAN, an E-UTRAN, or a legacy RAN, such as a UTRAN or GERAN. As used herein, the term "NG RAN" or the like may refer to a (R)AN 108 that operates in an NR or 5G system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WEAN node," "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPS, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G-system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) by a server pool in a similar manner as the CRAN/vBRUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an 5GC via an NG interface (discussed infra). In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RE energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PDSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs, Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 122 from an SeNB for user data; information of PDCP PDUs that were not delivered to a UE 122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a SG or NR system (e.g., when CN 106 is an SGC), the interface 130 may be an Xn interface. The Xn interface is defined between two or more RAN nodes (e.g., two or more gNBs and the like) that connect to SGC, between a RAN node 114 (e.g., a gNB) connecting to SGC and an eNB, and/or between two eNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116 and control of user plane tunnels between old (source) serving RAN node 114 to new (target) serving RAN node 116, A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network—in this embodiment. CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UNITS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and Access and Mobility Management Functions (AMFs).

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMEs.

Figure 2:
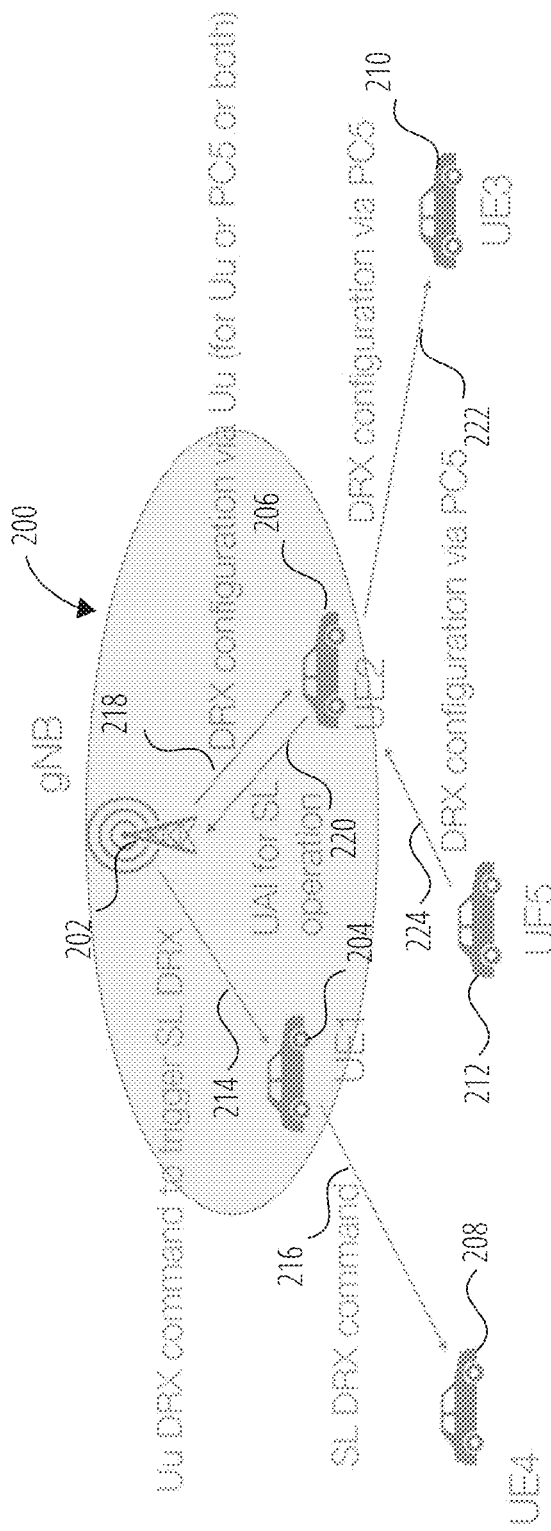
FIG. 2 is an annotated block diagram of a system for wireless communications, in accordance with one embodiment.

FIG. 2 shows an example of a wireless communications system 200 for SL operation. Wireless communications system 200 includes a gNB 202 communicatively coupled with a first UE 204 and a second UE 206. First UE 204 is communicatively coupled to a fourth UE 208. Second UE 206 is communicatively coupled to a third UE 210 and a fifth UE 212. In the present examples, the UEs are shown as vehicles because SL is commonly employed for Vehicle-to-Vehicle (V2V), which is a type of Vehicle-to-Everything (V2X) communication.

SL-DRX involves both Uu and PC5 interfaces. For an RRC_CONNECTED UE (also referred to as a connected mode UE, or simply connected UE), several SL-DRX enhancements are described in this disclosure.

In general, a first enhancement entails a gNB capable of triggering SL-DRX based on enhanced Uu MAC control element (CE) signaling to trigger UE to enter DRX. In the DRX command from gNB 202, an index may be used to point to one of the predefined (i.e., Uu or SL) DRX configurations. In one embodiment, this index is a pointer to a DRX configuration, such as a look-up table. To perform the look-up, the table is predefined. And which index value corresponds to which DRX configuration is also predefined. This table can be part of RRC configuration via Uu RRC. For example, a Uu DRX command to trigger SL DRX 214 is provided between gNB 202 and first UE 204 via MAC CE layer-2 signaling. An SL DRX command 216 (also layer-2 signaling) is made between first UE 204 and fourth UE 208. The Uu DRX MAC CE layer-2 command includes a flag (or 2-bits) to point out to be used in Uu, in SL, or in both.

A second enhancement entails a UE including its desired SL-DRX configuration or choices into a UEAssistanceInformation (UAI) message to a gNB. This can include all UE engaged DRX operations (common DRX, link-specific DRX). It can also establish how much traffic that is expected to be generated (e.g., how busy the link will be), so the DRX schedule (e.g., how frequently the UE will wake up) can be established. For example, a DRX configuration via Uu 218 (which can be designated to be used in Uu interface, or PC5 interface or both interfaces) in the form of RRC layer-3 signaling is provided from gNB 202 to second UE 206. Second UE 206 provides a UAI for SL operation 220 to gNB 202. A DRX configuration via PC5 222 (also layer-3 signaling) is provided from second UE 206 to third UE 210. A DRX configuration via PC5 224 is established between fifth UE 212 and second UE 206 by layer-3 signaling. In other embodiments, a SidelinkUEInformation (SUI) message may be used.

Alignment of SL-DRX alignment with Uu-DRX (referred to as Uu/SL DRX alignment or simply alignment) is also described, as an optional feature (since not all schedules can temporally align).

Figure 3:
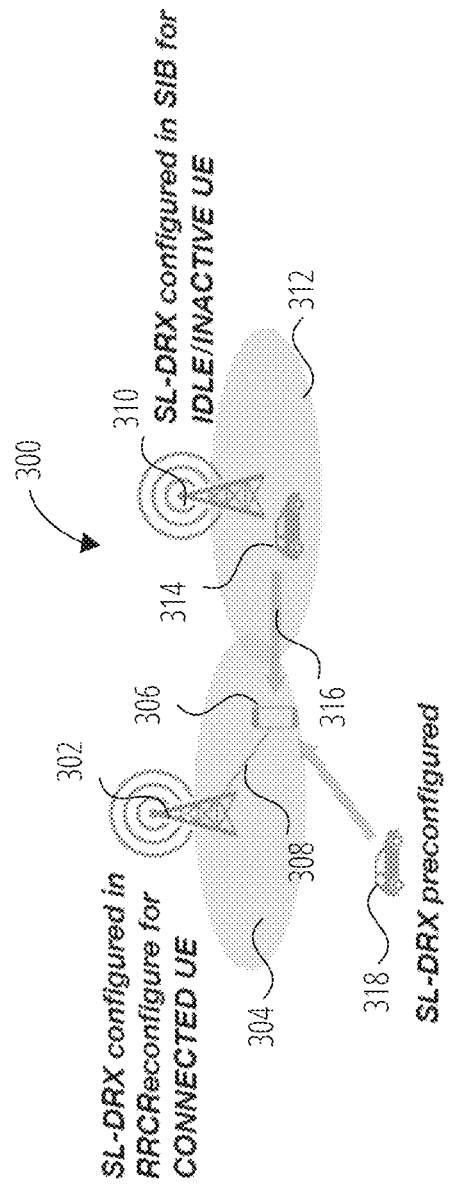
FIG. 3 is an annotated block diagram of a system for wireless communications, in accordance with one embodiment.

FIG. 3 is an annotated block diagram 300 showing an overview of RRC configuration of a sidelink. A first gNB 302 providing a first coverage area 304 is in wireless communication with a first UE 306 to form a Uu interface 308 between first UE 306 and first gNB 302. Accordingly, first UE 306 is in RRC connected mode and may be configured for a sidelink through RRCReconfigure messages. A second gNB 310 provides a second coverage area 312. A second UE 314 is located in second coverage area 312, but is in Idle/Inactive mode. Nevertheless, it receives a common DRX configuration in in a system information block (SIB). PC5-link specific configuration is also provided between first UE 306 and second UE 314, which have already had a PC5-RRC connection 316. Finally, a third UE 318 is preconfigured.

Thus, in the example of FIG. 3, a common configuration can be configured to all sidelink UEs in-coverage or out of coverage. This provides a baseline to ensure a sidelink UE works even as the transmitters in SL carriers are not always connected. PC5-link specific configuration is between the two UEs that have a PC5-RRC connection.

In some embodiments, a gNB makes a decision for UE for power-savings, based on information provided by UE regarding its SL engagements. If possible, the gNB will align Uu-DRX, with common and/or link-specific SL-DRX, If alignment is not feasible, gNB can still keep the DRX configurations separate. SL-DRX alignment with Uu-DRX is an optional feature. Skipping monitoring of PDCCH and skipping monitoring of PSCCH can be independently configured. A gNB is able to enable/disable the support of this feature.

Figure 4A:
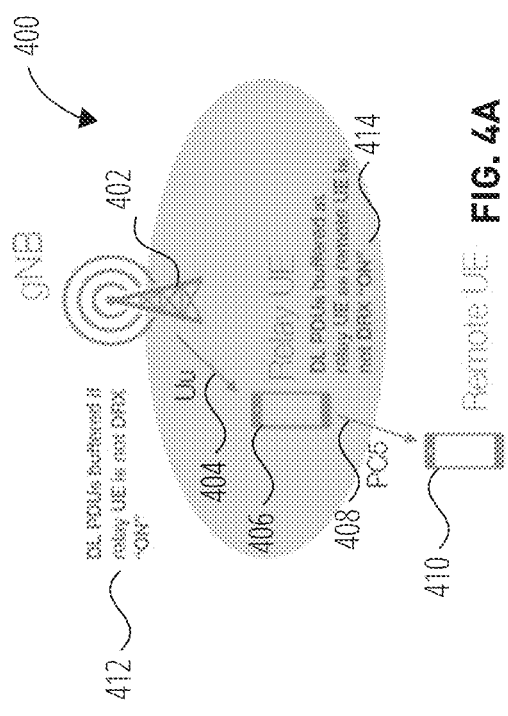
FIG. 4A is an annotated block diagram of a system for wireless communications, in accordance with one embodiment.

FIG. 4A shows an example SL DRX alignment with Uu DRX use case in an SL relay system 400 to explain the potential benefits of SL/Uu DRX alignment for sidelink relay. In the example, a gNB 402 has a Uu DRX link 404 with a relay UE 406. Relay UE 406 has a PC5 link 408 with a remote UE 410. Aside from power saving, alignment could reduce unnecessary buffering in sidelink relay and reduce overall end-to-end latency. For example, for the DL traffic, the traffic may be buffered twice: a first buffering 412 occurs at gNB 402, as relay UE 406 is in DRX inactive mode; a second buffering 414 occurs at relay UE 406, as remote UE 410 is in DRX inactive for PC5 link.

Figure 4B:
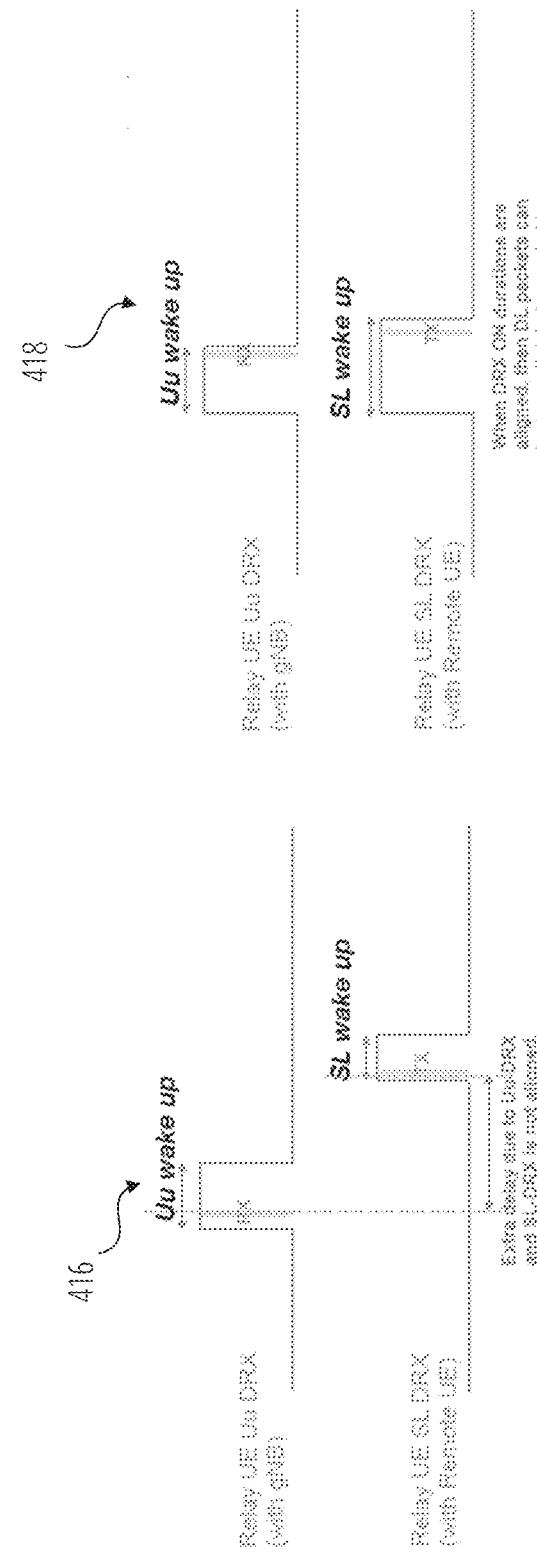
FIG. 4B is an annotated timing diagram showing non-overlapping and overlapping onDurations, in accordance with one embodiment.

FIG. 4B shows two examples in which Uu-DRX and SL-DRX cycles, respectively, are temporally spaced apart 416 and overlap 418 in terms of the wake up time "onDuration." When they overlap 418, e.g., due to alignment, second buffering 414 can be mitigated.

There are RX chain considerations when implementing Uu/SL DRX alignment. A RAN2 objective is to specify a mechanism aiming to align sidelink DRX wake-up time with Uu DRX wake-up time in an in-coverage UE. But fully overlapping alignment may not be always be desirable in every scenario. For example, in LTE ProSe, if a UE uses a single RX chain for WAN and D2D Communication, a discovery gap is configured for UE to switching to monitor D2D signals. LTE ProSe supports commercial discovery, which may not justify a dedicated RX chain for D2D. In NR SL, SL and Uu may operate in the same band. For example, n38 and n79 are added in Rel-16 by RAN4, and SL communication is not restricted to n47 ITS bands. If UE shares the single RX chain in licensed band for both V2X Sl, and NR DL reception, it is not suitable for alignment of Uu-DRX and SL-DRX. A UE may be able to do DL reception and SL reception at the same time (similar to intra-band CA), but TX in Sl, (as triggered in onDuration) would cause problem for PDCCH monitoring for Uu-DRX. Instead of full alignment, a TDM gap is implemented.

Figure 5A:
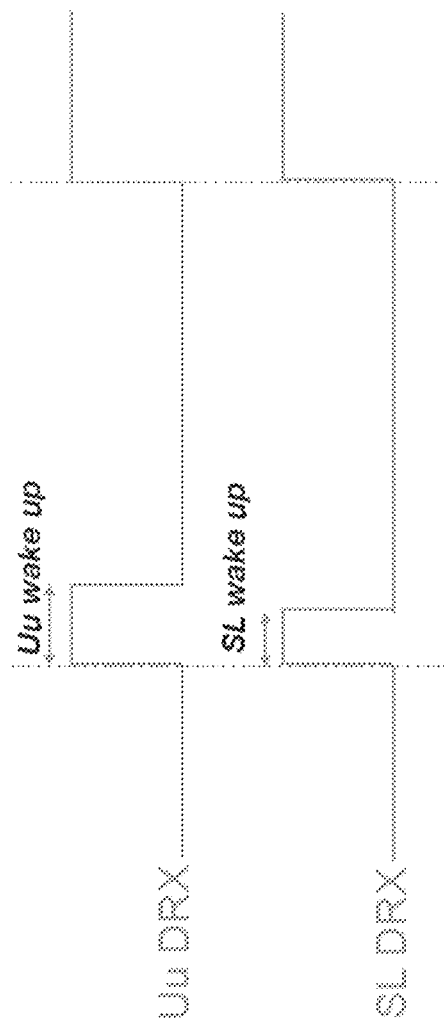
FIG. 5A is an annotated timing diagram showing DRX alignment, in accordance with one embodiment.
Figure 5B:
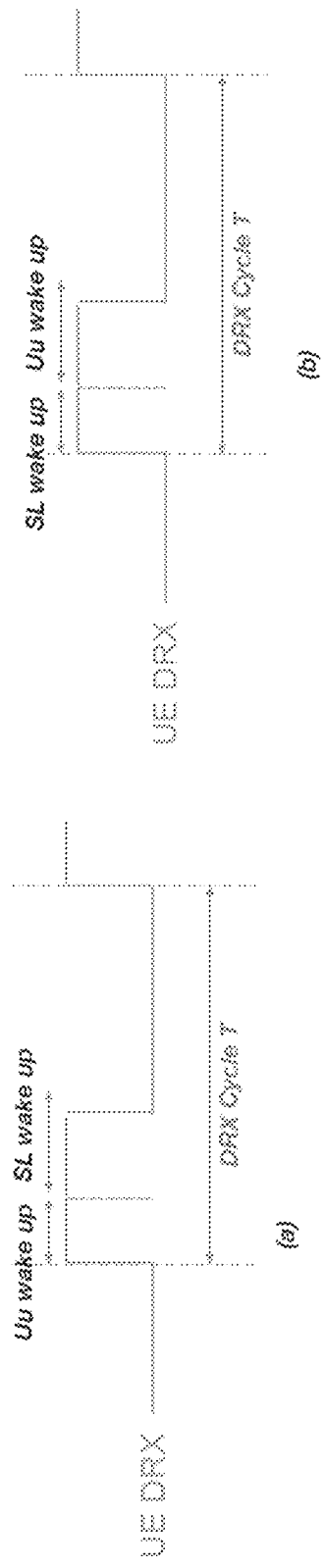
FIG. 5B is an annotated timing diagram showing two versions of adjacent DRX cycles, in accordance with one embodiment.

The above-mentioned scenarios raise the following two assumptions, which are shown by way of examples in, respectively, FIG. 5A and FIG. 5B.

First, for separate RX chain case, Uu-DRX and SL-DRX aligned with overlapping "onDurations." Accordingly, FIG. 5A shows Uu and SL are overlapping in a aligned common wake up period (e.g., dedicated RX chain for SL).

Second, for a single RX chain case, Uu-DRX and SL-DRX aligned but use non-overlapping, adjacent durations. FIG. 5B shows two examples in which Uu and SL are non-overlapping TDM-ed in a shared/common wake up period (e.g., single Rx chain, shared carrier) In this case, there are still some benefits to align then adjacently. For example, in SL relay case, the buffering time can be minimized for DL traffic. Even when DRX cycle is not overlapping, it may be desired to make them adjacent to each other so that the traffic forwarding latency can be reduced.

Figures 6, 7:
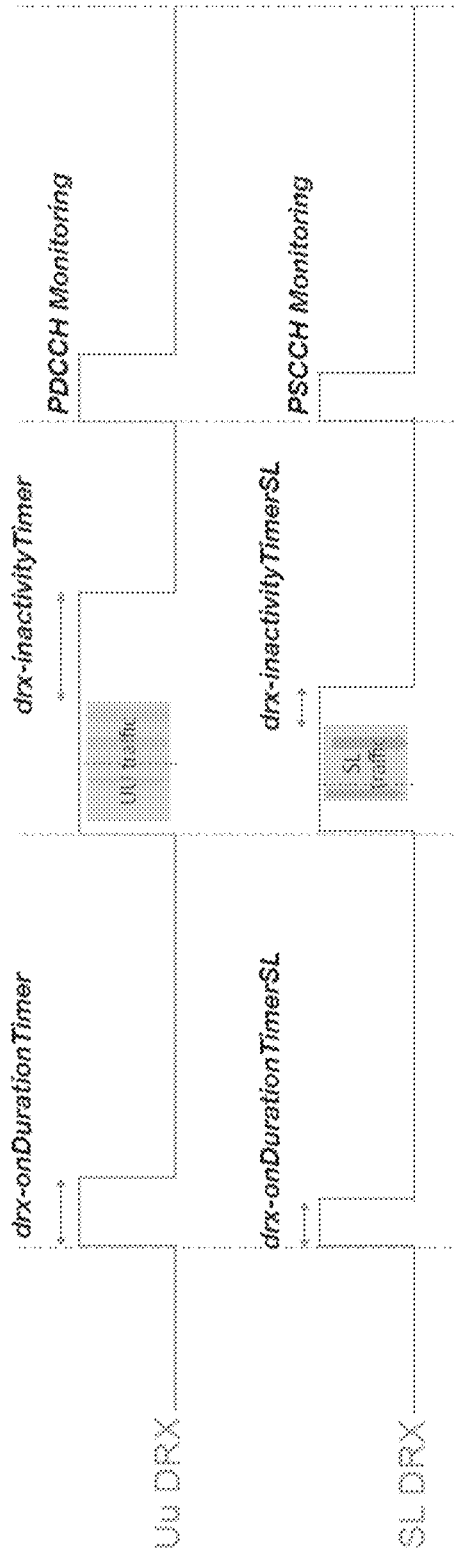
FIG. 6 is a table showing full and partial alignment, in accordance with one embodiment.
FIG. 7 is an annotated timing diagram showing another example of DRX alignment, in accordance with one embodiment.

With reference to FIG. 6, SL-DRX for CONNECTED mode, coordination with Uu DRX is described. In NR, a UE can be configured with connected mode DRX (C-DRX) in Vu (short and long DRX cycle). It may be advantageous to halt SL activity when Uu is in DRX mode, for the following reasons: First, mode 1 UE operation will be impacted by Uu C-DRX. In NR-V2X Rel-16, RAN2 agrees that UE does not expect DRX configuration if SL mode 1 is configured in Rel-16. Second, power savings cannot be fully achieved if SL operation is still ongoing, Uu RRC procedures for sidelink are used even for CONNECTED mode 2 UE, and SL operation may trigger some "activity" in Uu.

FIG. 6 summarizes the impact to SL RX and TX, if aligned with Uu-DRX. Note that the table includes SL-DRX partial alignment. The following two paragraphs describe examples for implementing such behavior.

In a first embodiment, the UE avoids mode 1 operation when Uu DRX is configured. UE switches to mode 2 TX (autonomous resource selection). Sidelink RX is not disabled (so no power-saving in SL). The network will enable/disable this "mode-switch" with a flag. UE no longer initiates any RRC message (e.g., SidelinkUEInformation). UE delays any report of new/modified QoS flow to network, and employs default SL radio bearer SLRB mapping for any QoS flow which does not have a configuration.

In a second embodiment, SL RX is shut off as long as Uu DRX is inactive, but limited TX activity is allowed without sensing. This approach achieves improved power savings. Mode 2 UE can transmit with use of random TX resource selection in configured pools. Mode 1 UE TX relies on Configured Grant Type 2. HARQ feedback can be either enabled or disabled, depending on whether a DRX INACTIVE UE can still receive Physical Sidelink Feedback Channel (PSFCH) or not.

FIG. 7 shows an example of alignment of DRX cycles in the SL-DRX for CONNECTED mode. In this example, alignment for Uu DRX and SL DRX means fully-aligned and Partial Alignment Option 2 (FIG. 6). In FIG. 7 the same DRX cycle applies to both downlink and sidelink. Cycle lengths are identical and UE may skip both PDCCH and PSCCH monitoring. SE DRX may also use a short and long cycle. OnDurations are aligned, although they need not necessarily be of identical length, and SL-DRX can have shorter onDuration. Inactivity timer configurations may be different as well.

Uu DRX configuration is UE-specific configuration and not known by other UEs, and not compatible with the common DRX configuration explained previously with reference to FIG. 3. C-DRX is arbitrary with plenty of choices because DRX can be started with arbitrary offset and cycle (see e.g., FIG. 8 drx-LongCycleStartOffset). The gNB is aware of the DRX configuration, so it can delay its DL traffic accordingly, but SL traffic is not controlled by the gNB. For SL DRX, if aligned to Uu-DRX configuration (i.e., the gNB chooses one of the configurations and forces the UE to go with the configuration for SL, not using default commonly known DRX cycle), any potential SL TX UE may not be aware of this because it may not know if RX UE is in RRC_CONNECTED and it does not know the coordinated Uu/SL-DRX configuration is used in RX UE. If SL traffic is destined to this UE during the DRX inactivity and the UE cannot be properly delayed, then that traffic will not be properly received by the UE which aligns its SL DRX cycle to a configured Uu C-DRX cycle. Packet loss will mount for SL-DRX UE which deviates from the commonly known SL DRX cycle.

Figure 9:
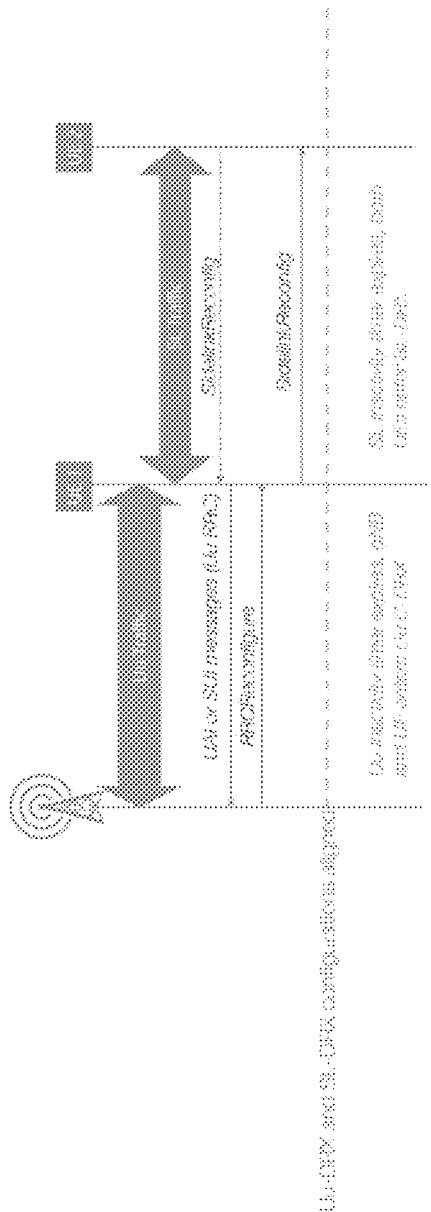
FIG. 9 is a message flow diagram, in accordance with one embodiment.

To address the aforementioned issue, FIG. 9 shows an example of restricting Uu DRX configuration to that of SL-DRX (match or alight Uu-DRX towards SL-DRX). In general, the gNB will decide what is the best alignment that can be provided, and then gNB shares this aligned configuration (common for both Uu and SL) to UE 1. More specifically, the gNB (and neighboring gNBs) will broadcast supported DRX cycle and offset (limited number of choices) to all UEs in the cell. SL UE reports its SL engagements and DRX configurations (received via Uu and via PC5) to the gNB. The gNB determines which SL DRX cycle based on SL service (QoS profile, PSID) or SL address. If possible, Uu DRX cycle is then aligned with SL DRX. Any SL TX sender, if it knows the RX UE may support SL DRX, assumes DRX is enabled and only transmit in onDuration. The gNB can enable/disable this alignment with a flag. If not aligned, the gNB can configure Uu-DRX with separate parameters.

In another embodiment to address the aforementioned issue, the DRX configuration is conveyed to other RRC_CONNECTED UEs via dedicated RRC signaling. If any CONNECTED UE B indicates it tries to transmit to a SL destination address which involves UE A's RX, it shares the UE'A DRX configuration in the RRCReconfig message to UE B. The approach works for CONNECTED UE in the same cell.

In another embodiment to address the aforementioned issue, a list of each UE and its DRX configuration is announced. The gNB (and neighboring gNBs) broadcast the list of SL destinations and its corresponding DRX cycles in broadcast RRC signaling (SIB). The approach contemplates inter-gNB signaling.

In another embodiment to address the aforementioned issue, there are SL announcements on the start of DRX. The UE, as inactivity timer is going to expire, sends a PC5-RRC broadcast message to the neighboring UEs about its own "aligned" DRX configuration. This approach contemplates additional reliability enhancements, as broadcast may not reach all UEs, especially when other UEs may also in SL-DRX.

In another embodiment to address the aforementioned issue, FIG. 9 also shows the UE can use PC5-RRC unicast messages to deliver its DRX configurations to UEs which it has PC5-RRC connections. The UE 1 can notify the peer UE 2 to also align its SL-DRX with this DRX configuration. This is suitable for a UE which has SL unicast traffic to serve. For bi-directional traffic, the PC5 interface can align the DRX.

Figure 10A:
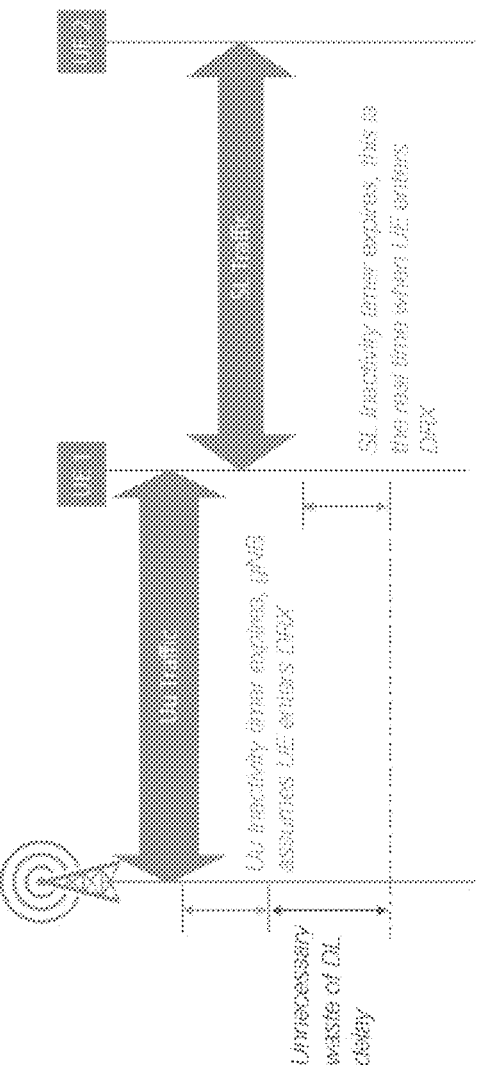
FIG. 10A is a message flow diagram, in accordance with one embodiment.

FIG. 10A shows how Uu activity and SL activity are not in-sync (different applications, different traffic profile). When Uu traffic pauses, SL traffic may still ongoing, or vice versa. While UE can know both Uu and SL traffic, the gNB may not be aware of SL traffic. The gNB may unnecessarily delay the DL traffic when it falsely assumes UE1 is in DRX state. This may not be a material issue as UE still benefits from skipping PDCCH decoding. Nevertheless, to address the issue, there are several embodiments.

In one embodiment, a single inactivity timer is re-defined to take account of both Uu and SL activities. Accordingly, UE the enters DRX when there is inactivity in both interfaces and does not enter DRX when either interface has activity. In case of a lack of Uu traffic, sidelink UE keeps Uu busy so that the gNB will not misunderstand the DRX status. For instance, it may send some dummy traffic in Uu when SL traffic is ongoing.

Figure 10B:
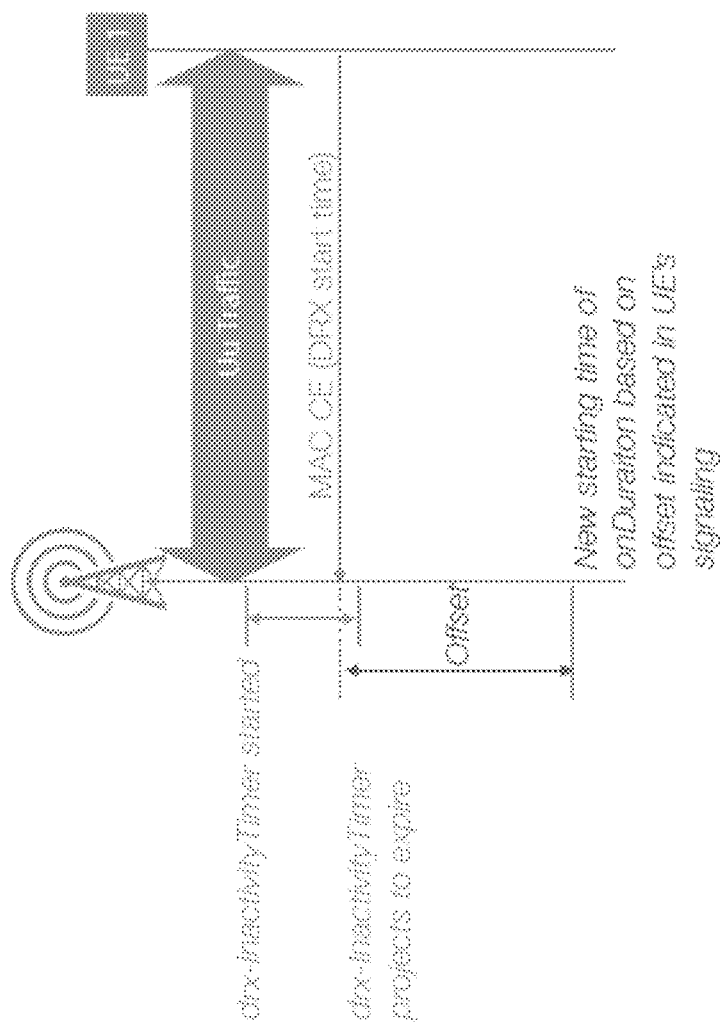
FIG. 10B is a message flow diagram, in accordance with one embodiment.

FIG. 10B shows another embodiment. Separate inactivity timers in Uu and SL are maintained. The gNB cannot track the SL inactivity timer, so the UE sends UL signaling to keep the gNB updated on SL activities. A new UL MAC CE is designed for this purpose, and it indicates the "predicted" starting time of DRX based on SL traffic activities. Timings received from MAC CE overrides the default drx-inactivityTimer mechanism.

Figure 11:
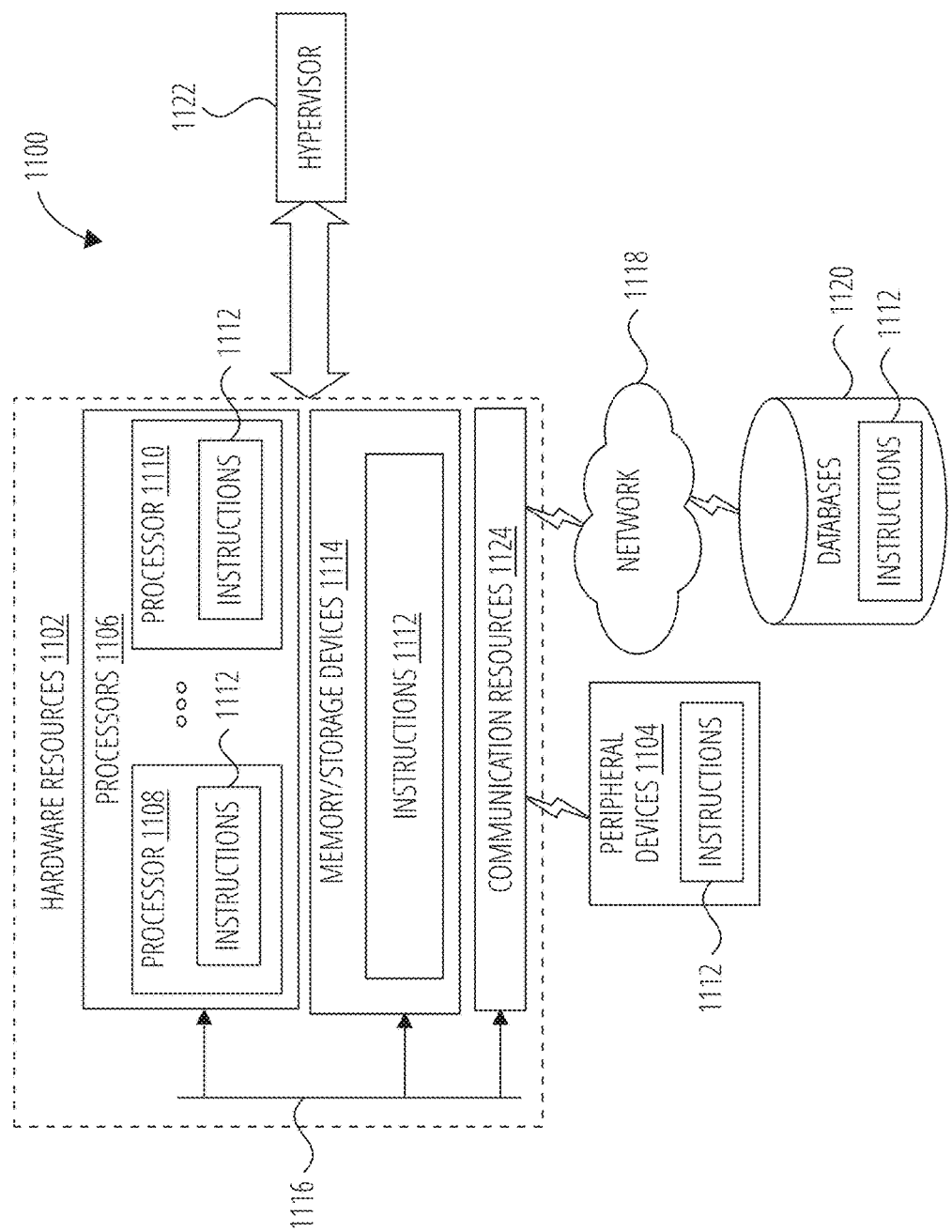
FIG. 11 is a block diagram, according to one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1106 (or processor cores), one or more memory/storage devices 1114, and one or more communication resources 1124, each of which may be communicatively coupled via a bus 1116. For embodiments where node virtualization (e.g., NFV) is utilized, a hypervisor 1122 may be executed to provide an execution environment for one or more network slices/sub-slices to utilize the hardware resources 1102.

The processors 1106 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1108 and a processor 1110.

The memory/storage devices 1114 may include main memory, disk storage, or any suitable combination thereof. The memory/storage devices 1114 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1124 may include interconnection or network interface components or other suitable devices to communicate with one or more peripheral devices 1104 or one or more databases 1120 via a network 1118. For example, the communication resources 1124 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1112 may comprise software, a program, an application, an applet, an app, or other executable code for causing at least any of the processors 1106 to perform any one or more of the methodologies discussed herein. The instructions 1112 may reside, completely or partially, within at least one of the processors 1106 (e.g., within the processor's cache memory), the memory/storage devices 1114, or any suitable combination thereof. Furthermore, any portion of the instructions 1112 may be transferred to the hardware resources 1102 from any combination of the peripheral devices 1104 or the databases 1120. Accordingly, the memory of the processors 1106, the memory/storage devices 1114, the peripheral devices 1104, and the databases 1120 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1. A method, performed by a first user equipment (UE) in connected mode with a gNB, of entering sidelink (SL) discontinuous reception (DRX), the method comprising: receiving from the gNB a Uu DRX MAC control element (CE) layer-2 command to trigger the first UE to enter either Uu or SL DRX indicated in the Uu DRX MAC CE layer-2 command; and processing the Uu DRX MAC CE layer-2 command to determine whether to enter Uu DRX or SL DRX with a second UE.

Example 2. The method of Example 1, in which the Uu DRX MAC CE layer-2 command includes an index representing one of a predefined Uu DRX configuration or SL DRX configuration.

Example 3. The method of Example 1, further comprising RRC signaling to configure a look up table so that the Uu DRX MAC CE layer-2 command indicates a DRX configuration.

Example 4. The method of Example 3, in which the Uu DRX MAC CE layer-2 command includes a flag to indicate whether the look up table is be used in Uu, in SL, or in both.

Example 5. The method of Example 3, in which the look up table is a concatenated table for both Uu and SL DRX.

Example 6. The method of Example 3, in which the look up table includes two different tables and the Uu DRX MAC CE layer-2 command includes a flag to indicate which table is used.

Example 7. A method, performed by a first user equipment (UE) in connected mode with a gNB, of configuring sidelink (SL) discontinuous reception (DRX), the method comprising: generating for the gNB a first RRC message including a desired SL-DRX configuration; and in response to the first RRC message, receiving via Uu from the gNB a second RRC message specifying a DRX configuration for one or both of Uu and PC5 interfaces.

Example 8. The method of Example 7, in which the first RRC message comprises a UEAssistance Information (UAI) message including the desired SL-DRX configuration.

Example 9. The method of Example 7, in which the first RRC message comprises a SidelinkUEInformation (SUI) message including the desired SL-DRX configuration.

Example 10. The method of Example 9, in which SUI or RRC message contain the DRX configurations used by peer UEs.

Example 11. The method of Example 7, in which the first RRC message includes parameters for common DRX operations.

Example 12. The method of Example 7, in which the first RRC message includes parameters for link-specific DRX operations.

Example 13. A method, performed by a first user equipment (UE), of aligning discontinuous reception (DRX) over Uu and sidelink (SL) by restriction of Uu-DRX configuration to those aligned with SL-DRX, the method comprising: providing a Un RRC message to a gNB to report SL engagements and DRX configurations; and receiving from the gNB an RRCReconfigure message to align DRX cycles.

Example 14. The method of Example 13, in which the Uu RRC message comprises a UEAssistance Information (TIM) message.

Example 15. The method of Example 13, in which the Uu RRC message comprises a SidelinkUEInformation (SUI) message.

Example 16. The method of Example 13, further comprising receiving an initial SidelinkReconfig layer-3 message from a second UE to cause the first UE to provide the Uu RRC message to the gNB.

Example 17. The method of Example 13, further comprising receiving a message from the gNB to disable alignment.

Example 18. The method of Example 13, further comprising providing a SidelinkReconfig layer-3 message to a second UE having a PC5 interface with the first UE.

Example 19. A non-transitory computer-readable storage medium, the computer-readable storage medium including instructions that when executed by a first user equipment (UE) connected mode with a gNB, of entering sidelink (SL) discontinuous reception (DRX), cause the first UE to: receive from the gNB a Uu DRX MAC control element (CE) layer-2 command to trigger the first UE to enter either Uu or SL DRX indicated in the Uu DRX MAC CE layer-2 command; and process the Uu DRX MAC CE layer-2 command to determine whether to enter Uu DRX or SL DRX with a second UE.

Example 20. The computer-readable storage medium of Example 19, in which the Uu DRX MAC CE layer-2 command includes an index representing one of a predefined Uu DRX configuration or SL DRX configuration.

Example 21. The computer-readable storage medium of Example 19, wherein the instructions further configure the first UE to RRC signal to configure a look up table so that the Uu DRX MAC CE layer-2 command indicates a DRX configuration.

Example 22. The computer-readable storage medium of Example 21, in which the Uu DRX MAC CE layer-2 command includes a flag to indicate whether the look up table is be used in Uu, in SL, or in both.

Example 23. The computer-readable storage medium of Example 21, in which the look up table is a concatenated table for both Uu and SL DRX.

Example 24. The computer-readable storage medium of Example 21, in which the look up table includes two different tables and the Uu DRX MAC CE layer-2 command includes a flag to indicate which table is used.

Example 25. A non-transitory computer-readable storage medium, the computer-readable storage medium including instructions that when executed by a user equipment (UE), cause the UE to: generate for the gNB a first RRC message including a desired SL-DRX configuration; and in response to the first RRC message, receive via Uu from the gNB a second RRC message specifying a DRX configuration for one or both of Uu and PC5 interfaces.

Example 26. The computer-readable storage medium of Example 25, in which the first RRC message comprises a UEAssistance Information (UAI) message include the desired SL-DRX configuration.

Example 27. The computer-readable storage medium of Example 25, in which the first RRC message comprises a SidelinkUEInformation (SUI) message include the desired SL-DRX configuration.

Example 28. The computer-readable storage medium of Example 27, in which SUI or RRC message contain the DRX configurations used by peer UEs.

Example 29. The computer-readable storage medium of Example 25, in which the first RRC message includes parameters for common DRX operations.

Example 30. The computer-readable storage medium of Example 25, in which the first RRC message includes parameters for link-specific DRX operations.

Example 31. A non-transitory computer-readable storage medium, the computer-readable storage medium including instructions that when executed by a first user equipment (UE), cause the computer to: provide a Uu RRC message to a gNB to report SL engagements and DRX configurations; and receive from the gNB an RRCReconfigure message to align DRX cycles.

Example 32. The computer-readable storage medium of Example 31, in which the Uu RRC message comprises a UEAssistance Information (UAI) message.

Example 33. The computer-readable storage medium of Example 31, in which the Uu RRC message comprises a SidelinkUEInformation (SUI) message.

Example 34. The computer-readable storage medium of Example 31, wherein the instructions further configure the UE to receive an initial SidelinkReconfig layer-3 message from a second UE to cause the first UE to provide the Uu RRC message to the gNB.

Example 35. The computer-readable storage medium of Example 31, wherein the instructions further configure the first UE to receive a message from the gNB to disable alignment.

Example 36. The computer-readable storage medium of Example 31, wherein the instructions further configure the first UE to provide a SidelinkReconfig layer-3 message to a second UE having a PC5 interface with the first UE.

Example 37 may include an apparatus comprising means to perform one or more elements of a method described in or related to any of the above Examples, or any other method or process described herein.

Example 38 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 39 may include an apparatus comprising logic, modules, or circuitry to perform one or more elements of a method described in or related to any of the above Examples, or any other method or process described herein.

Example 40 may include a method, technique, or process as described in or related to any of the above Examples, or portions or parts thereof.

Example 41 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 42 may include a signal as described in or related to any of the above Examples, or portions or parts thereof.

Example 43 may include a datagram, packet, frame, segment, protocol data unit (PDU), or message as described in or related to any of the above Examples, or portions or parts thereof, or otherwise described in the present disclosure.

Example 44 may include a signal encoded with data as described in or related to any of the above Examples, or portions or parts thereof, or otherwise described in the present disclosure.

Example 45 may include a signal encoded with a datagram, packet, frame, segment, PDU, or message as described in or related to any of the above Examples, or portions or parts thereof, or otherwise described in the present disclosure.

Example 46 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 47 may include a computer program comprising instructions, wherein execution of the program by a processing element is to cause the processing element to carry out the method, techniques, or process as described in or related to any of the above Examples, or portions thereof.

Example 48 may include a signal in a wireless network as shown and described herein.

Example 49 may include a method of communicating in a wireless network as shown and described herein.

Example 50 may include a system for providing wireless communication as shown and described herein.

Example 51 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a first user equipment (UE) in a connected mode with a gNB, of entering sidelink (SL) discontinuous reception (DRX), the method comprising:
    receiving from the gNB a Uu DRX medium access control (MAC) control element (CE) layer-2 command triggering the first UE to enter either Uu or SL DRX indicated in the Uu DRX MAC CE layer-2 command;
    receiving radio resource control (RRC) signaling, wherein the RRC signaling configures a look up table indicating the Uu DRX MAC CE layer-2 command comprises a DRX configuration, and wherein the look up table includes two different tables and the Uu DRX MAC CE layer-2 command includes a flag to indicate which table is used; and
    processing the Uu DRX MAC CE layer-2 command to determine whether to enter Uu DRX or SL DRX with a second UE.

2. The method of claim 1, in which the Uu DRX MAC CE layer-2 command includes an index representing one of a predefined Uu DRX configuration or SL DRX configuration.

3. The method of claim 1, in which the Uu DRX MAC CE layer-2 command includes a flag to indicate whether the look up table is to be used in Uu, in SL, or in both.

4. The method of claim 1, in which the look up table is a concatenated table for both Uu and SL DRX.

5. An apparatus for a first user equipment (UE) in a connected mode with a gNB, comprising:
- a memory to store a Uu discontinuous reception (DRX) medium access control (MAC) control element (CE) layer-2 command; and
- one or more processors are configured to cause the first UE to:
    - receive from the gNB the Uu DRX MAC control element (CE) layer-2 command triggering the first UE to enter either Uu or SL DRX indicated in the Uu DRX MAC CE layer-2 command;
    - receiving radio resource control (RRC) signaling, wherein the RRC signaling configures a look up table indicating the Uu DRX MAC CE layer-2 command comprises a DRX configuration, and wherein the look up table includes two different tables and the Uu DRX MAC CE layer-2 command includes a flag to indicate which table is used; and
    - process the Uu DRX MAC CE layer-2 command to determine whether to enter Uu DRX or SL DRX with a second UE.

6. The apparatus of claim 5, in which the Uu DRX MAC CE layer-2 command includes an index representing one of a predefined Uu DRX configuration or SL DRX configuration.

7. The apparatus of claim 5, in which the Uu DRX MAC CE layer-2 command includes a flag to indicate whether the look up table is to be used in Uu, in SL, or in both.

8. The apparatus of claim 5, in which the look up table is a concatenated table for both Uu and SL DRX.

9. A non-transitory computer-readable storage medium including instructions that, when executed by one or more processors of a first user equipment (UE) in a connected mode with a gNB, cause the first UE to:
- receive from the gNB a Uu discontinuous reception (DRX) medium access control (MAC) control element (CE) layer-2 command triggering the first UE to enter either Uu or sidelink (SL) DRX indicated in the Uu DRX MAC CE layer-2 command;
- receiving radio resource control (RRC) signaling, wherein the RRC signaling configures a look up table indicating the Uu DRX MAC CE layer-2 command comprises a DRX configuration, and wherein the look up table includes two different tables and the Uu DRX MAC CE layer-2 command includes a flag to indicate which table is used; and
- process the Uu DRX MAC CE layer-2 command to determine whether to enter Uu DRX or SL DRX with a second UE.

10. The non-transitory computer-readable storage medium of claim 9, in which the Uu DRX MAC CE layer-2 command includes an index representing one of a predefined Uu DRX configuration or SL DRX configuration.

11. The non-transitory computer-readable storage medium of claim 9, in which the Uu DRX MAC CE layer-2 command includes a flag to indicate whether the look up table is to be used in Uu, in SL, or in both.

12. The non-transitory computer-readable storage medium of claim 9, in which the look up table is a concatenated table for both Uu and SL DRX.

* * * * *